(12) United States Patent
Scholl et al.

(10) Patent No.: US 11,568,461 B2
(45) Date of Patent: Jan. 31, 2023

(54) FACILITATING ONLINE TRANSACTIONS

(71) Applicant: Groupon, Inc., Chicago, IL (US)

(72) Inventors: Nathaniel Blake Scholl, Oakland, CA (US); Andrew David Miner, Kent, WA (US); Jason Alan Crawford, San Francisco, CA (US)

(73) Assignee: GROUPON, INC., Chicago, IL (US)

( * ) Notice: Subject to any disclaimer, the term of this patent is extended or adjusted under 35 U.S.C. 154(b) by 240 days.

(21) Appl. No.: 16/551,953

(22) Filed: Aug. 27, 2019

(65) Prior Publication Data

US 2020/0058058 A1   Feb. 20, 2020

Related U.S. Application Data

(63) Continuation of application No. 15/486,188, filed on Apr. 12, 2017, now Pat. No. 10,467,671, which is a continuation of application No. 13/657,728, filed on Oct. 22, 2012, now Pat. No. 9,665,898.

(60) Provisional application No. 61/550,328, filed on Oct. 21, 2011.

(51) Int. Cl.
*G06Q 30/00* (2012.01)
*G06Q 30/06* (2012.01)

(52) U.S. Cl.
CPC ..... *G06Q 30/0613* (2013.01); *G06Q 30/0601* (2013.01)

(58) Field of Classification Search
CPC ............... G06Q 30/00; G06Q 30/0601; G06Q 30/0613; G06Q 30/0641
See application file for complete search history.

(56) References Cited

U.S. PATENT DOCUMENTS

| | | | | |
|---|---|---|---|---|
| 7,334,184 | B1* | 2/2008 | Simons | G06F 16/9535 |
| | | | | 715/234 |
| 2002/0174023 | A1* | 11/2002 | Grey | G06Q 40/04 |
| | | | | 705/37 |
| 2005/0028082 | A1* | 2/2005 | Topalov | G06F 15/167 |
| | | | | 715/224 |
| 2005/0256841 | A1* | 11/2005 | Rawat | G06Q 30/04 |
| 2006/0069763 | A1* | 3/2006 | Kido | H04L 67/1001 |
| | | | | 709/223 |
| 2009/0030749 | A1* | 1/2009 | Drummond | G06Q 30/06 |
| | | | | 705/7.31 |
| 2009/0204881 | A1* | 8/2009 | Murthy | G06F 40/174 |
| | | | | 715/226 |

(Continued)

OTHER PUBLICATIONS

Zhang, Jia, et al. "A service-oriented multimedia componentization model." International Journal of Web Services Research (IJWSR) 2.1 (2005): 54-76. (Year: 2005).*

(Continued)

*Primary Examiner* — Christopher B Seibert
(74) *Attorney, Agent, or Firm* — Alston & Bird LLP

(57) ABSTRACT

Merchandise content is aggregated from numerous merchant sources and presented on computing devices of individual users. Users are able to purchase select individual merchandise items by performing a simplified action, such as a screen tap on a touchscreen device. When the user performs the action, a series of actions are performed programmatically and/or automatically on behalf of the user to initiate and complete the transaction for the selected merchandise item from the merchant source.

19 Claims, 11 Drawing Sheets

(56) References Cited

U.S. PATENT DOCUMENTS

| | | | |
|---|---|---|---|
| 2011/0041170 A1* | 2/2011 | Wankmueller | G06Q 20/4014 715/764 |
| 2011/0047608 A1* | 2/2011 | Levenberg | H04L 63/0807 726/7 |
| 2013/0047242 A1* | 2/2013 | Radhakrishnan | H04L 9/3231 726/9 |
| 2013/0103538 A1 | 4/2013 | Scholl et al. | |

OTHER PUBLICATIONS

Jin, Keren, Jiafeng Zhu, and Guangbin Fan. "MET: Multi-party E-Commerce Transaction Model." 2011 IEEE Third International Conference on Privacy, Security, Risk and Trust and 2011 IEEE Third International Conference on Social Computing. IEEE, 2011. (Year: 2011).

U.S. Provisional Application as filed Oct. 17, 2012., U.S. Appl. No. 61/715,229.

* cited by examiner

FACILITATING ONLINE TRANSACTIONS

CROSS-REFERENCE TO RELATED APPLICATIONS

This application is a continuation of U.S. patent application Ser. No. 15/486,188, filed Apr. 12, 2017 (now U.S. Publication No. 2018/0068363) which is incorporated by reference herein in its entirety, which application is a continuation of U.S. patent application Ser. No. 13/657,728, filed Oct. 22, 2012 (now U.S. Pat. No. 9,665,898), which is incorporated by reference herein in its entirety, which application claims priority to and the benefit of U.S. Provisional Patent Application No. 61/550,328, filed Oct. 21, 2011, which is incorporated by reference herein in its entirety.

TECHNICAL FIELD

The disclosed embodiments relate to a systems and methods for facilitating online transactions.

BACKGROUND

Online e-commerce has evolved in the variety of transactions that are available for facilitating purchases. Increasingly, online mediums are being used in offering sales, deals (e.g. daily deals), clearance items and similar discounted goods and services.

In addition to variety, the number of outlets that are available has also increased. Major e-commerce sites are increasingly supplemented with sites that specialize, for example, in the types of products offered, or in providing overstock items.

Increasingly, consumers are using numerous kinds of computing platforms to make online purchases. For example, consumers may utilize anyone of a mobile device (e.g., cellular telephony/messaging devices), tablet, Internet television, laptop or desktop to make an online purchase. Some computing platforms are more difficult to use for e-commerce activities. For example, users of mobile computing devices have difficult "checkout" experiences, particularly when the checkout page of a site is not formatted for the mobile device. Furthermore, on many computing devices (e.g., mobile devices, Internet television), the experience of logging in and then entering payment and shipping information is tedious.

SUMMARY

Embodiments include a system and method for facilitating consumers to purchase merchandise items from e-commerce sources using a variety of computing devices, such as mobile computing devices. Some embodiments may provide the aggregation of various deal and/or other offers from different sources into a single listing or other type of display interface. Further, embodiments discussed herein can enable an online form to be programmatically analyzed, completed and submitted by a machine without the user having to manually do so.

For example, embodiments discussed herein are related to systems, computer readable media having instructions for, methods and other means for completing an electronic form. The electronic form can be completed in the course of ordering products online, making reservations for dinner, and/or registering for any other product or free service. The method can include, for example, receiving user profile information comprised of profile components; receiving a request to complete an electronic form; accessing a programmatic agent that configures a processor to map at least some of the profile components to data entries needed to complete the electronic form provided by the third party; determining, by the processor configured by the programmatic agent, which of the profile components are to be used to complete the electronic form; and transmitting the profile components in a manner that causes the electronic form to be completed programmatically.

In some embodiments, the method may also or instead include transmitting the profile components to a remotely-located network server of an online retailer. As such, receiving user profile information can comprise receiving a consumer's address, the consumer's name, and the consumer's purchasing information (e.g., credit card number, username/password to an online payment service, etc.).

In some embodiments, the ordering and/or other form completion process can begin in response to receiving a first trigger input associated with product information. The programmatic agent can be accessed in response to receiving the trigger input and/or the product information identifying a first product to be purchased can be transmitted in response to receiving the trigger input. In some embodiments, a timer and/or other mechanism can be used to consolidate multiple orders (e.g., to avoid having to pay separate shipping charges to the same merchant). For example, after the first trigger input is received, some embodiments may be configured (e.g., by a user, as default, and/or otherwise) to wait to see if there are any other trigger inputs received that are associated with the same merchant as the first trigger event. If subsequent trigger inputs are received over the predetermined period of time (e.g., as measured from when the first trigger input was received), which are associated with different products sold by the same merchant as the first product, the transactions associated with the subsequent trigger inputs can be queued together until the predetermined period of time expires and/or the user specifically instructs the system to execute the transaction. In response to determining the predetermined period of time has expired or the user has explicitly instructed the transaction to occur, the purchase of the first product and/or the subsequent products from the merchant can be facilitated. As such, the purchase of the first product and the different products occur as single online purchase order.

Some embodiments may also be configured to determine whether the electronic form has been modified; and in response to determining the electronic form has been modified, facilitate the updating of the programmatic agent used to map information to the form and/or otherwise complete the form.

In some embodiments, a determination as to which of the profile components are to be used to complete the electronic form can comprise: determining whether merchant account login information is associated with the user profile, wherein the merchant account login information is specific to a merchant associated with the electronic form; and in response to determining the merchant account login information is associated with the user profile, transmit the merchant account login information as at least some of the profile components.

A determination can be made in some embodiments as to whether the user profile has been used to complete a previous transaction associated with a merchant that is also associated with the electronic form, and in response to determining the merchant is a new merchant, additional information required to complete the electronic form can be requested from a user using screen display prompts.

Some embodiments may also or instead include a method, system, non-transitory computer readable media and/or other means for aggregating information, comprising: retrieving information associated with a plurality of items for sale from a plurality of online sources; identifying a transaction type associated with each of the plurality of items; accessing a user profile indicating categories of preferred transaction types; selecting specific items from the plurality of items based on the transaction type of the items matching the preferred transaction types indicated by the user profile; and associating the specific items with the user profile.

The selecting of the specific items can be based on an amount of savings offered due to a current discount being offered on a normal price of the specific items and/or an availability of the specific items, such that the specific items are selected only if there is at least a predetermined number of the specific items available, among other things.

The specific items can be displayed to a user associated with the user profile; and the user can be enabled to delete one or more of the specific items. In response to the user deleting one or more of the specific items, a determination can be made that there has been an update to the user profile modifying the preferred transaction types; and at least some associations of the specific items can be removed in response to the modifications made to the preferred transaction types.

The specific items can be displayed to a user associated with the user profile; and the user can be enabled to purchase one or more of the specific items in accordance with some embodiments.

According to embodiments, merchandise content is aggregated from numerous merchant sources and presented on computing devices of individual users. Users are able to purchase select individual merchandise items by performing a simplified action, such as a screen tap on a touchscreen device. When the user performs the action, a series of actions are performed programmatically and/or automatically on behalf of the user to initiate and complete the transaction for the selected merchandise item from the merchant source.

BRIEF DESCRIPTION OF THE DRAWING(S)

Having thus described the example embodiments of the present invention in general terms, reference will now be made to the accompanying drawings, which are not necessarily drawn to scale, and wherein:

FIGS. 6A-6M show example displays that may be presented by, for example, a client device in accordance with some embodiments herein.

DETAILED DESCRIPTION

Figure 1A:
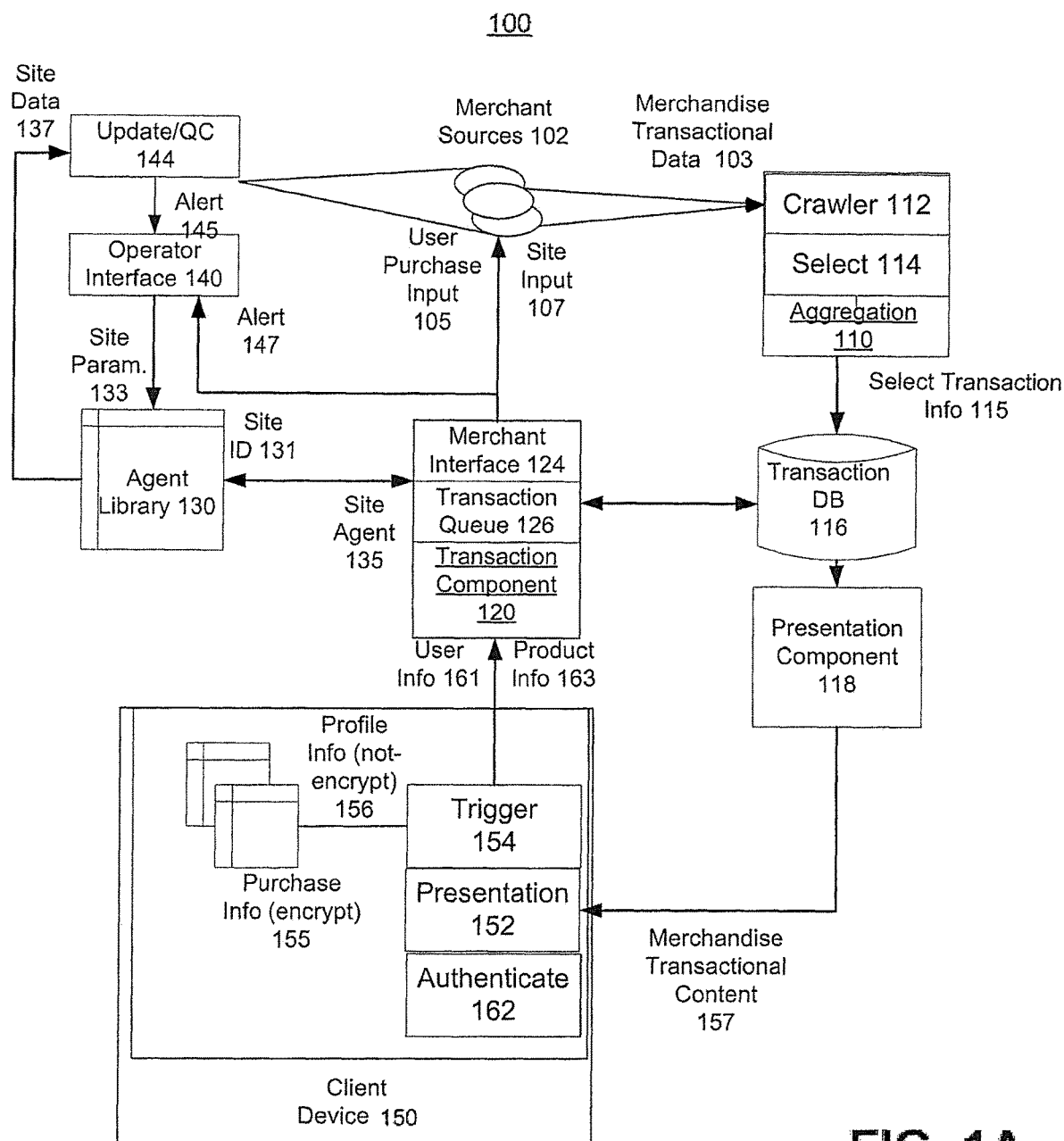
FIG. 1A shows an example network-based system configured to provide means for enabling online transactions in accordance with some embodiments discussed herein.

Some embodiments discussed herein include a system, such as that shown in FIG. 1A, and/or various method methods that aid in facilitating consumers in purchasing products (e.g., goods and/or services) from e-commerce sources and/or other merchants. For example, the consumer may use a consumer device, which may function as a client device in a client-server based network architecture, while the merchant may use a merchant device, which function as the server in the architecture.

For example, the systems discussed herein can be configured to implement methods that automatically and/or programmatically complete electronic forms for a consumer or other user of a client device. For example, when a consumer would like to purchase a product online, the online merchant may provide an online form to the client device, and require the consumer to provide information to complete the form wholly or partially. Completing the form can be a requisite for approving the purchase request. For example, the online form may request the consumer's name, mailing address, email address, telephone number, purchasing information (e.g., credit card and/or other payment account number, billing address, etc.) and/or any other user-related information. As another example, a consumer may want to sign-up for a rewards program (e.g., frequent flyer program), enroll in a deal offer or other discount program, and/or otherwise register for service(s) provided by a third party, such as payment services that are discussed in commonly-assigned U.S. Provisional Patent Application No. 61/715,229, titled "PEER-TO-PEER PAYMENT PROCESSING," filed Oct. 18, 2012, which is incorporated by reference herein in its entirety.

In some embodiments, the online form may be embodied as a single webpage having fillable fields that prompt the consumer for specific information (e.g., name, address, telephone number, email address, etc.). Additionally or alternatively, the online form may be embodied as a plurality of displays that are each configured to be presented by a mobile device (such as a smart phone or tablet), wherein one or more of the screens prompts the client device user for requested/required information. In any regard, as referred to herein, a "form" can include any request for information from a user.

To aid the user in completing online and other types of electronic forms, embodiments herein can be configured to receive some or all the information typically required by one or more particular online forms in advance. For example, embodiments discussed herein can be configured to receive the user's name, mailing address, email address, telephone number, purchasing information (e.g., credit card and/or other payment account number, billing address, etc.) and/or any other user-related information, which can each be designated as profile components. The profile components are defined herein as pieces and/or groups of information that may be mapped to one or more prompts for information included in an online form. As discussed below, the user profile information (including its components) can be stored locally by the client device and/or at a remotely located networked device.

Embodiments may also include software, firmware and/or hardware, sometimes referred to herein as a "programmatic agent," that can configure the client device, server device and/or third party device to map the user profile information (e.g., one or more specific components) to one or more prompts for information in an electronic form. In this manner, the user of the client device need not spend time completing electronic forms when making purchases, reservations and/or otherwise registering for services, and the server device need not be configured to provide forms that are more platform-specific (e.g., configured to be optimized for mobile and/or other types of devices).

In addition to assisting the user in completing online forms, some embodiments discussed herein are related to aggregating deals and/or other information determined to be of interest to the user. For example, some embodiments discussed herein can retrieve information associated with a plurality of items for sale from a plurality of online sources and identify those that are currently being offered for discounted prices. For example, the prices of one or more products can be compared automatically by a server that is configured to identify the lowest price for the product. The product can then be categorized (e.g., health/beauty, dining, outdoor activities, educational, etc.) and the user can be able to express an interest and/or disinterest in one or more of the categories. Information on products having the lowest price among the same/similar products online and matching a category of interest to a user can then be provided to the user's device. The user's device can be configured to present an aggregation of all products determined to be of the lowest cost and of possible interest to the user. The user may be able to interact with the display to further define the user's profile and modify future results presented by embodiments discussed herein. For example, the user may remove a product listing from the display and the system may update the user's profile to reflect the user is currently disinterested in that category of product.

As used herein, the terms "data," "content," "information" and similar terms may be used interchangeably to refer to data capable of being captured, transmitted, received, displayed and/or stored in accordance with various example embodiments. Thus, use of any such terms should not be taken to limit the spirit and scope of the disclosure. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, and/or the like. Similarly, where a computing device is described herein to send data to another computing device, it will be appreciated that the data may be sent directly to the another computing device or may be sent indirectly via one or more intermediary computing devices, such as, for example, one or more servers, relays, routers, network access points, base stations, and/or the like.

System Architecture

Figure 1B:
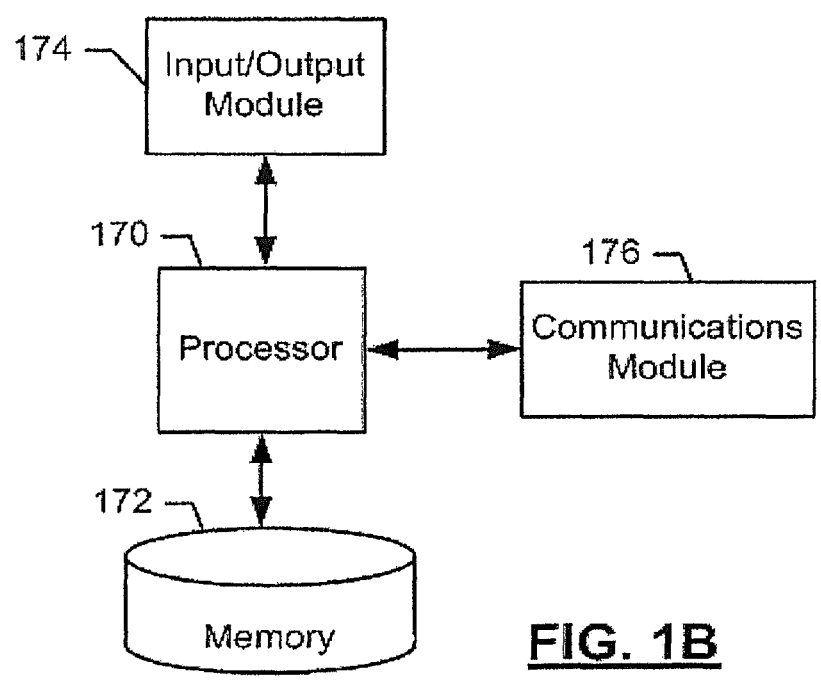
FIG. 1B shows example circuitry that that may be included in one or more components of the system of FIG. 1A in accordance with some embodiments discussed herein.

FIG. 1A illustrates a system, namely system 100, configured to enable online transactions according to one or more embodiments. In some embodiments, system 100 may include one or more network sub-systems, such as merchant sources 102, configured to communicate with a plurality of client devices 150. Merchant sources 102 may be implemented using, for example, one or more servers and/or other network hardware that are accessible to various client devices via a network, which may include a public network, such as the Internet, a private network, such as an intranet, or combinations thereof, that may utilize a variety of networking protocols now available or later developed including, but not limited to TCP/IP based networking protocols. FIG. 1B shows example hardware that may be included in accordance with some embodiments of network side sub-system 102 and/or other servers discussed herein. While some examples are discussed herein in the context of merchant devices and consumer devices that facilitate the shopping for and purchasing of items, the architecture and functionality of system 100 can likewise be applied to any other application that may involve completing a form and/or otherwise providing information to a networked device and/or aggregating information from multiple, independent online sources of information.

Client devices 150 may be operated by users, such as consumers. In this regard, a machine used by a consumer or other type of end user may be referred to herein as a "client device," "consumer device" or "user device," which may be a personal computer (e.g., desktop computer) and/or mobile device (e.g., tablet computer, laptop computer, cellular telephone, etc.), Internet enabled televisions (or "Internet television"), and gaming consoles, among other things. Client device 150 can be implemented on a variety of device platforms, including mobile devices that operate any of many possible operating systems. FIGS. 6A-6M show example displays that may be presented by one or more display screens of one or more client devices.

System 100 can be configured to operate to, for example, (i) generate a presentation of merchandise transactional content on one or more client devices 150, and (ii) enable the user to cause the client device 150 to signal a desire to purchase individual merchandise items in response to presenting a relatively simple, intuitive user interface element (e.g., a tap-to-buy on a touch screen, as described below) or set of actions, and/or (iii) respond to the signal(s) received from the user device 150 by performing a series of subsequent programmatic actions on behalf of the user that result in the selected merchandise item being purchased for the user.

In some embodiments, system 100 can be configured to function as and/or otherwise include aggregation component 110, merchandise content database 116, presentation component 118, and/or transaction component 120, among other things. These components, like others discussed herein, can be cloud-based components (e.g., implemented by specially-configured network machines located remote from client devices 150) and/or implemented partially or wholly on client devices 150. For example, traditional merchants may include content database 116, wherein item information is stored in the cloud and can be accessed by client devices 150. As another example, consumers may also act as merchants and/or configure their client devices to function as a merchandise content database 116 and/or aggregation component 110.

Aggregation component 110 can include and/or be configured to function as crawler 112 that accesses various online data sources, such as merchant sources 102 that may include online merchants' product information (e.g., retail websites, bargain sites, etc.), to obtain merchandise transaction data 103. In some embodiments, merchant sources 102 may be operated independently and remotely from the client devices 150.

Merchandise transaction data 103 can be transmitted from merchant sources 102 to aggregation component 110. In some embodiments, merchandise transaction data 103 can include a collection of data items that individually identify one or more items of merchandise for purchase, which are each sometimes referred to herein as a "merchandise transaction data item." The merchandise transaction data item can be representative of any product and/or other type of information. For example, merchandise transaction data 103 may comprise numerous merchandise transaction data items aggregated from multiple online sites, each of which can identify a corresponding item (or items) of merchandise for sale. The merchandise transaction data items may each comprise a set of images and/or text, as well as links, metadata and/or functionality that enables individual users (e.g., using client devices 150) to select and purchase a particular item of merchandise. For example, merchandise transaction data 103 may corresponds to a collection of merchandise transaction items aggregated from sources such as online catalogs, e-commerce sites, promotional offerings (such as those offered by Groupon, Inc. of Chicago, Ill.) and/or any other discounted item with which an amount of cost savings has been determined is being offered relative to the normal price (sometimes referred to herein as "deals"). More specifically, merchandise transaction data 103 may include content such as images and text that describe a corresponding merchandise item, as well as links that enables the user to select an item for purchase (e.g., links that open the purchasing page, shopping cart and/or other type of online form). Specific examples of merchandise items identified with merchandise transaction data 103 can include, for example, clothing, apparel, electronics, home furnishings, automobile accessories, hardware, salon services, travel services (e.g., airline tickets, hotel room reservations, etc.) and/or any other type of products. Additionally or alternatively, the merchandise transaction data items may include a variety of different transaction types, such as clearance sales or "daily deals," and/or identify the quantity remaining (if applicable) at a given price. Further, in some embodiments, merchandise transaction data can include sku information and/or other product identifying information (e.g., color, size, service duration, service provider's name, manufacturer country of origination, etc.).

In some embodiments, selection component 114 can be configured to implement logic and/or criteria to select specific merchandise transaction data items 115 (e.g., an entry that identifies a particular merchandise item) from the collection of merchandise transaction data 103. The selection criteria by which individual merchandise transaction data items 115 are selected from others can include, for example, the amount of savings offered in the individual transaction item for the corresponding merchandise, the availability of the merchandise (e.g., quantity available for sale, variety of sizes or colors), any other user-entered selection criteria provided by the client device 150, and/or any other system provided selection criteria. The selection criteria may be used by selection component 114 to select merchandise transaction items 115 from the aggregated collection of merchandise transaction data 103. For example, a user's profile can be used to determine what merchandise transaction items 115 are selected and displayed by a client device 150 associated with the user's profile (e.g., the client device onto which the user is signed into the user's profile). As such, the client device 150 can be configured to display the selected merchandise transaction items 115 based on the user profile, and enable the user to delete one or more of the specific items. Upon deleting a selected transaction item 115 from the display presented by the client device 150, a determination can be made that there has been an update to the user profile (e.g., modifying the transaction types, such as product categories, the user is interested and/or those the user is disinterested), and subsequent selected transaction items 115 can be chose based on different criteria (e.g., to exclude those items the user has indicated a disinterest therein).

Aggregation component 110 can be configured to store the selected merchandise transaction data items 115 in the transaction database 116. Presentation component 118 can be configured to generate device merchandise transactional content 157 for individual data items based on the selected merchandise transaction data items 115. Presentation component 118 may be configured to format and/or otherwise structure the merchandise transactional content 157 for a particular device type and/or platform associated with specific client devices 150. Presentation component 118 can be configured to communicate the device merchandise content 157 to, for example, the client device 150, where the content is displayed in a manner that enables user interaction, such as merchandise viewing and/or purchasing.

According to some embodiments, client device 150 can include components that correspond to presentation 152, trigger 154, and one or more user and/or device specific data stores 155, 156. In some embodiments, presentation component 152 can be configured to receive merchandise transactional content 157 from network subsystem 102. Merchandise transactional content 157 can be associated with merchandise transactional data items that are selected and aggregated from multiple different merchant sites as discussed above. Presentation component 118 and/or 152 may reformat the content for the requirements (e.g., platform, operating system, etc.) of the client device 150. For example, merchandise content 157 can includes multiple merchandise transaction items aggregated from multiple merchant websites. Merchandise content 157 may be displayed on client device 150 (e.g., on a user's smartphone) in a scrollable fashion, so as to enable the user to scroll through items and/or other product information. The merchandise transaction data items that are displayed on client device 150 may be formatted for the device's platform, and be further modified to enable its presentation as an entry in a scrollable list and/or any other suitable presentation configuration. As an addition or variation, the merchandise transaction items can be categorized by parameters such as the type of merchandise, manufacturer or brand, date in which the merchandise transaction item was offered or identified, and/or by any other suitable criteria.

As an addition or alternative, the presentation component may sort, filter or otherwise prioritize the presentation of select merchandise transactional data items represented by merchandise content 157. For example, the presentation component 152 may display, or prioritize the display of merchandise transactional data items that are new as compared to the user's prior viewing (e.g. last time the user opened a client application). Still further, preference parameters of the user may be used to prioritize and/or filter the merchandise content by type (e.g. electronics versus clothing), brand, price range, and/or other parameters. In these regards, the merchandise content 157 that is presented to the various users may differ. The user-specific parameters may be stored together and/or otherwise associated with a user profile.

According to embodiments, trigger 154 can be associated with a programmatic input element provided by client device 150 that enables the user to select individual merchandise data items presented on the client device 150. For example, trigger 154 can be provided by way of an icon and/or other feature that can be selected by a simple user action, such as a tap (e.g., on a touchscreen, the user tapping the display surface at a region that coincides with presentation of the icon). As described herein, trigger 154 can include functionality displayed with each merchandise data item and/or group(s) of merchandise data items. A user's activation of trigger 154 for a given data item can identify a corresponding merchandise data item (e.g., a network location and corresponding content in which an item is offered for sale), as well as the source for the data item. When the trigger 154 is activated by a user input (e.g., user tap), a series of operations performed by various components of system 100 can be initiated by the client device 150. In some embodiments, many of the operations can be automatically performed, and transparently to the user, enabling the user to, for example, readily purchase a merchandise item by tapping a button on a screen. For example, activation of trigger 154 can initiate a series of operations that include: receiving/accessing user profile information comprised of profile components; receiving a request or otherwise determining there is an electronic form to be completed; accessing a programmatic agent that configures a processor to map at least some of the profile components to data entries needed to complete the electronic form provided by the third party; determining, by the processor configured by the programmatic agent, which of the profile components are to be used to complete the electronic form; and transmitting the profile components in a manner that causes the electronic form to be completed programmatically. As such, the client device and/or other components of system 100 can be configured to identify user specific information (e.g., associated with a user profile) required for purchasing the selected merchandise item from the corresponding merchandise store, and then communicating the information to the network-side subsystem 102 to initiate and complete the transaction.

According to embodiments, the user-specific information can include encrypted information 155 of the user (e.g., credit card number, expiration data and CCV code) and/or online transaction login information (e.g., such as a user name and password). In some embodiments, all of the user information may be encrypted, whereas in others some or none of the user information is encrypted. Where there is at least some user information that is not encrypted, non-encrypted profile information 156 of the user can be included (e.g., information that identifies the user's account information with the particular merchant website, cookies, etc.). Encrypted information 155 and/or unencrypted information 156 may also include preferences of the user, such as to size, color and/or modes of shipment. User preferences and/or other discrete sets of information included in encrypted information 155 and/or unencrypted information 156 are sometimes referred to herein as "profile components."

In response to trigger 154 being activated, client device 150 can be configured to communicate one or more profile components as user information 161 (which may be based on at least some of encrypted information 155 and/or unencrypted information 156) and/or product information 163 to transaction component 120. User information 161 may include the purchasing information 155, and relevant profile components from the encrypted information 155 (e.g., user login information for the particular merchant) and/or unencrypted information 156. According to some embodiments, at least some of the purchasing information 155 (as well as the profile information 156) is stored in encrypted form on the client device 150. The profile components that are transmitted can be determined and/or based on merchant and/or other third party providing the form that is being completed (e.g., in response to the user selecting trigger 154 to purchase an item). For example, a first merchant may require the user's name, purchasing information and mailing address, while a second merchant may require all the above as well as an email address and telephone number. Some or all of this information can be associated with the user's profile (either as encrypted information 155 and/or unencrypted information 156) and client device 150 can be configured to determine and/or receive information identifying which profile components should be sent to facilitate various online transactions. For example, JavaScript can be running on client device 150 and/or other component of system 100 that indicates which profile components are needed by a particular third party with which consumer device 150 is communicating.

Authentication mechanism 162 may be included to enable the user to unlock encrypted information for communication to the transaction component 160. For example, the authentication mechanism 162 can correspond to a passkey (e.g., 4-digit code that the user enters on a device) that enables the user to operate client device 150, and/or communicate the encrypted information (e.g., purchasing information 155) using client device 150.

In this way, embodiments can be configured to enable transaction component 120 to use information communicated from client device 150 to programmatically (e.g., without further user input) perform a series of steps that complete a transaction with the merchant source for the merchandise item, using, for example, (i) purchasing information, (ii) user profile components, and/or (iii) any other suitable information system 100 can access/generate. For example, transaction component 120 may be configured to access individual merchant websites to programmatically perform actions on behalf of the user for completing a transaction for the user's identified merchandise item, thereby resulting in the user being able to purchase products from the online merchant or other type of service provider without having to manually complete a form required by the online merchant or other type of service provider.

While the consumer device 150 may be configured to perform some or all of the functionality discussed above, transaction component 120 may also or instead be configured to perform some or all of the functionality discussed above, thereby providing a cloud solution. In some embodiments, transaction component 120 is independent of the merchant device(s) and/or the consumer device(s) and is maintained by a third party. Transaction component 120 can be configured to include a merchant interface 124 that can facilitate communications with the merchant device and implement any one of multiple possible merchant agents for enabling virtual actions to be performed on behalf of the user. For example, a merchant agent can be configured to aid in completing a transaction on behalf of a user for selected merchandise item(s), registering the consumer for a rewards program, enrolling the user in a deal offer or other discount program, and/or otherwise registering the user for service(s) provided by a merchant (and/or other party). To facilitate this functionality, transaction component 120 can be configured to communicate with or otherwise include agent library 130 that can include programmatic elements or other types of agents (e.g., scripts) that are merchant and/or source (e.g., website) specific. For example, the agents can be configured to map one or more profile components to one or more data entry fields of a form required to be completed by a web source when placing an online purchase order or other type of service request. In some embodiments, agent library 130 can be developed automatically by system 100 and/or by human operators via an operator interface 140. For example, system 100 and/or operators may access a merchant website to generate a map that implements parameters and functionality that reflects the structure of the website and associates profile components with particular fields of an online order form and/or other type of form. In some embodiments, operators can develop schemas for individual sites to enable programmatic completion of location of features, such as click-to-add to shopping cart, use of user-interface features on site for enabling product selection (e.g., size or color selection), specifying shipping and other options on the purchasing page, and/or clicking to purchase a selected item, among other things. The operators may analyze individual forms (including the data entry fields that comprise the forms) based on, for example, the underlying code in the page, a document object model (DOM) of the page, and the presence of markers, including text and/or other content (e.g., detect the word "shipping") on a web page.

In some embodiments, merchant interface 124 includes a virtual browser and/or other programmatic component that uses site identifier 131 (to the merchant source identified from the product information 163) to identify site agent 135 to the merchant site from the agent library 130. For example, site agent 135 can be configured to correspond to a script that configures the virtual browser of the merchant interface 124 to access the network location at the specific merchant site ("site input 107"). The network location may be identified from product information 153. Site agent 135 can be configured to further or instead enable merchant interface 124 to provide user purchase input 105 to virtually perform the actions required for completing a transaction on behalf of the user of client device 150 for the merchandise item identified in user information 161. These actions include, for example, logging into the merchant site on behalf of the user (e.g., based on corresponding profile components of the user's profile), providing credit card or account information at the merchant site (e.g., based on corresponding profile components of the user's profile), identifying the specific merchandise item(s) that the user wishes to purchase (e.g., based on the user selecting trigger 154 associated with the one or more specific merchandise item(s)), selecting characteristics of the merchandise item, such as size and color (e.g., based on corresponding profile components of the user's profile), and/or virtually performing otherwise manual operations (e.g., virtual clicks) to add the merchandise item to a user's shopping cart and to check out (e.g., specify or enter financial account information, specify shipping information and/or shipping preference), among other things.

In some embodiments, one or more programmatic agents (e.g., site agent 135) can be configured to enable a machine to complete an order and/or other service (by, e.g., completing a form) as if the order/service had been requested by the user directly. This functionality of the agents can result in an enhanced ability of a system, such as described in FIG. 1A to be transparent to merchants.

In some embodiments, transaction component 120 may also or instead include transaction queue 126. Transaction queue 126 can be configured to queue individual transactions received from client device 150 over the course of a designated duration of time (e.g., 30 minutes). For example, transaction queue 126 can configure a machine to queue multiple transactions from a single client together, particularly as to a specific merchant source, and then signal the merchant source(s) at the end of the designated duration. The designated duration may initiate from the time that a first transaction request is received from client device 150. In this way, multiple transactions may be specified to a given merchant source on behalf of the user. Depending on merchant offerings, queuing the user's purchase requests can, for example, save on shipping costs and/or enable the user to receive a discount that is provided when shoppers have multiple purchases from a given source. In some embodiments, the client device can be configured to provide the user an indication of how many and what items are in the transaction queue that are associated with the user and/or when to close the queue and initiate the order of everything in the queue.

According to some embodiments, update/quality check component 144 can be configured to communicate with and use transaction database 116 to access various merchant sites to determine the reliability of individual site agents 135. For example, update/quality check component 144 can be configured to determine whether or not the site agent associated with the particular web source is able to accurately map profile components to fields of an electronic form required by the web source when placing an order or otherwise requesting services. The determination may include programmatic simulation of actions that would otherwise be performed by merchant interface 124, and/or alternatively by the user, in purchasing a product from a website and/or other type of merchant source 102. On occasion, problems or alterations may occur at a particular website (e.g., alteration in site structure, product sold-out, etc.) that cause the programmatic purchase from that location to be difficult or impossible. In such instances, update/quality check 144 may signal an alert 145 via the operator interface 140, which can result in an operator and/or system 100 automatically accessing the site and updating the agent (or disabling it, or manually implementing orders received for the particular merchant site).

As an alternative or addition, some embodiments provide for alerts from the merchant website to be transmitted to the user of the client device 150. For example, if the user orders items and one is sold out, the alert from the merchant site may be detected by system 100 and communicated to the client device. As another example, if the product price increases during the time between the user order being initiated by the user on the client device 150 and the order being communicated from the transaction component 120 to the merchant site, an alert may be generated from system 100 or the merchant site requesting that the user approve the increase.

Additionally, as noted with some embodiments, a designated duration may pass between the user selecting to purchase an item and the transaction component 120 actually attempting to make the purchase. In such embodiments, variations provide that the transaction component 120 performs several steps towards making the purchase of the user (without actually making the purchase). For example, the transaction component 120 may calculate tax and shipping and validate user information (like passwords, credit cards, and addresses). This allows an extra verification step to be performed on system 100 to determine pricing and availability while the user is likely still using the client device. On occasion, alerts such as described can be communicated to the user using emails, text messages, push notifications and/or any other suitable information delivery mechanisms.

As such, according to some embodiments, merchandise content can be aggregated from numerous merchant sources and presented on computing devices of individual users. Users are able to purchase select individual merchandise items by performing a simplified action, such as a screen tap on a touchscreen device. When the user performs the action, a series of actions are performed programmatically and/or automatically on behalf of the user to initiate and complete the transaction for the selected merchandise item from the merchant source.

According to some embodiments, a client is provided on a user device (e.g., mobile computing device) which communicates with a network subsystem. When the user selects to purchase a merchandise item, the client communicates necessary user-information (e.g., account information, shipping information and preferences) to the network subsystem. The network subsystem is configured to perform a series of operations that are specific to a merchant website to complete the transaction for the user.

In an embodiment, a trigger input is received from a client device. The computing device transmits purchasing information over a network to a network component. The purchasing information identifies a product, a purchasing source for the product, and a payment source for making payment for the product at the source. The network component receives the purchasing information from the computing device, and selects a programmatic agent for purpose of purchasing the product from the merchant source on behalf of the user.

Among other benefits, embodiments described herein enable a user to make purchases on a variety of computing devices (e.g., handsets) using a simplified action. Additionally, embodiments enable the transaction functionality of various different online merchants to be presented in the same manner, so that the same simplified action or interaction can be used on multiple merchant sites.

As another benefit, embodiments such as described below can be implemented without requirements by merchant site to accommodate the functionality of the system. At least some embodiments can be implemented without integration requirements from merchant websites.

FIG. 1B shows a schematic block diagram of example hardware components, some or all of which may be included in, that can be included in any or all of the machines that comprise system 100. As illustrated in FIG. 1B, in accordance with some example embodiments, the circuitry may include various means, such as one or more processors 170, memories 172, input/output modules 174, and/or communications modules 176. The circuitry of FIG. 1B can be included in, for example, client devices 150, transaction component 120, agent library 130, merchant sources 102, aggregation component 110, transaction database 116, presentation component 118 and/or any other component(s) of system 100.

As referred to herein, "module" includes hardware, software and/or firmware configured to perform one or more particular functions. In this regard, the means of the circuitry as described herein may be embodied as, for example, circuitry, hardware elements (e.g., a suitably programmed processor, combinational logic circuit, and/or the like), a computer program product comprising computer-readable program instructions stored on a non-transitory computer-readable medium (e.g., memory 172) that is executable by a suitably configured processing device (e.g., processor 170), or some combination thereof.

Processor 170 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 25 as a single processor, in some embodiments, processor 170 comprises a plurality of processors. The plurality of processors may be embodied on a single computing device or may be distributed across a plurality of computing devices collectively configured to function as the circuitry. The plurality of processors may be in operative communication with each other and may be collectively configured to perform one or more functionalities of the circuitry as described herein. In an example embodiment, processor 170 is configured to execute instructions stored in memory 172 or otherwise accessible to processor 170. These instructions, when executed by processor 170, may cause the circuitry to perform one or more of the functionalities of the circuitry as described herein.

Whether configured by hardware, firmware/software methods, or by a combination thereof, processor 170 may comprise an entity capable of performing operations according to embodiments of the present invention while configured accordingly. Thus, for example, when processor 170 is embodied as an ASIC, FPGA or the like, processor 170 may comprise specifically configured hardware for conducting one or more operations described herein. As another example, when processor 170 is embodied as an executor of instructions, such as may be stored in memory 172, the instructions may specifically configure processor 170 to perform one or more algorithms and operations described herein, such as those discussed in connection with FIGS. 1, 2, 13 and 14.

Memory 172 may comprise, for example, volatile memory, non-volatile memory, or some combination thereof. Although illustrated in FIG. 25 as a single memory, memory 172 may comprise a plurality of memory components. The plurality of memory components may be embodied on a single computing device or distributed across a plurality of computing devices. In various embodiments, memory 172 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. Memory 172 may be configured to store information, data (including deal parameter data and/or analytics data), applications, instructions, or the like for enabling the circuitry to carry out various functions in accordance with example embodiments of the present invention. For example, in at least some embodiments, memory 172 is configured to buffer input data for processing by processor 170. Additionally or alternatively, in at least some embodiments, memory 172 is configured to store program instructions for execution by processor 170. Memory 172 may store information in the form of static and/or dynamic information. This stored information may be stored and/or used by the circuitry during the course of performing its functionalities.

Communications module 176 may be embodied as any device or means embodied in circuitry, hardware, a computer program product comprising computer readable program instructions stored on a computer readable medium (e.g., memory 172) and executed by a processing device (e.g., processor 170), or a combination thereof that is configured to receive and/or transmit data from/to another device, such as, for example, a second circuitry and/or the like. In some embodiments, communications module 176 (like other components discussed herein) can be at least partially embodied as or otherwise controlled by processor 170. In this regard, communications module 176 may be in communication with processor 170, such as via a bus. Communications module 176 may include, for example, an antenna, a transmitter, a receiver, a transceiver, network interface card and/or supporting hardware and/or firmware/software for enabling communications with another computing device. Communications module 176 may be configured to receive and/or transmit any data that may be stored by memory 172 using any protocol that may be used for communications between computing devices. Communications module 176 may additionally or alternatively be in communication with the memory 172, input/output module 174 and/or any other component of the circuitry, such as via a bus.

Input/output module 174 may be in communication with processor 170 to receive an indication of a user input and/or to provide an audible, visual, mechanical, or other output to a user (e.g., merchant and/or consumer). Some example visual outputs that may be provided to a user by the circuitry are discussed in connection with FIGS. 3-12 and 15-23. As such, input/output module 174 may include support, for example, for a keyboard, a mouse, a joystick, a display, an image capturing device, a touch screen display, a microphone, a speaker, a RFID reader, barcode reader, biometric scanner, and/or other input/output mechanisms. In embodiments wherein the circuitry is embodied as a server or database, aspects of input/output module 174 may be reduced as compared to embodiments where the circuitry is implemented as an end-user machine (e.g., consumer device and/or merchant device) or other type of device designed for complex user interactions. In some embodiments (like other components discussed herein), input/output module 174 may even be eliminated from the circuitry. Alternatively, such as in embodiments wherein the circuitry is embodied as a server or database, at least some aspects of input/output module 174 may be embodied on an apparatus used by a user that is in communication with the circuitry, such as for example, merchant device 2410 and/or consumer device 2412. Input/output module 174 may be in communication with memory 172, communications module 176, and/or any other component(s), such as via a bus. Although more than one input/output module and/or other component can be included in the circuitry, only one is shown in FIG. 25 to avoid overcomplicating the drawing (like the other components discussed herein).

Methodology

As will be appreciated, computer program instructions and/or other type of code may be loaded onto a computer, processor or other programmable apparatus's circuitry to produce a machine, such that the computer, processor other programmable circuitry that execute the code on the machine create the means for implementing various functions, including those described herein. It is also noted that all or some of the information presented by the example displays discussed herein can be based on data that is received, generated and/or maintained by one or more components of system 100. In some embodiments, one or more additional systems (such as a remote cloud computing and/or data storage system) may also be leveraged to provide at least some of the functionality discussed herein.

As described above and as will be appreciated based on this disclosure, embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Embodiments of the present invention have been are described herein with reference to block diagrams and flowchart illustrations of methods, apparatuses, systems and computer program products. It will be understood that each block of the circuit diagram, functional system diagram and process flowcharts, and combinations of blocks in the circuit diagrams and process flowcharts, respectively, can be implemented by various means including computer program instructions. These computer program instructions may be loaded onto a general purpose computer, special purpose computer, or other programmable data processing apparatus, such as processor 170 discussed above with reference to FIG. 1B, to produce a machine, such that the computer program product includes the instructions which execute on the computer or other programmable data processing apparatus create a means for implementing the functions specified in the flowchart block or blocks.

These computer program instructions may also be stored in a computer-readable storage medium (e.g., memory 172) that can direct a computer or other programmable data processing apparatus to function in a particular manner, such that the instructions stored in the computer-readable storage medium produce an article of manufacture including computer-readable instructions for implementing the function discussed herein. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions discussed herein.

Accordingly, blocks of the circuit diagram, functional system diagram and flowcharts support combinations of means for performing the specified functions, combinations of steps for performing the specified functions and program instruction means for performing the specified functions. It will also be understood that each block/step of the circuit diagram, functional system diagram and process flowcharts, and combinations of blocks/steps therein, can be implemented by special purpose hardware-based computer systems that perform the specified functions or steps, or combinations of special purpose hardware and computer instructions.

One or more embodiments described herein provide that methods, techniques and actions performed by a computing device are performed programmatically, or as a computer-implemented method. Programmatically means through the use of code, or computer-executable instructions. A programmatically performed step may or may not be automatic.

One or more embodiments described herein may be implemented using programmatic modules or components. A programmatic module or component may include a program, a subroutine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

In addition to the methodology discussed above, FIGS. 2-5 show process flow diagrams of example machine-implemented methods in accordance with some embodiments described herein. Methods such as described with FIGS. 2-5 may be implemented using, for example, one or more processors of system 100, such as described in connection with FIG. 1A. Accordingly, reference is made to elements of system 100 for purpose of describing example components that are suitable for performing a step or substance being described in accordance with some embodiments.

Figure 2:
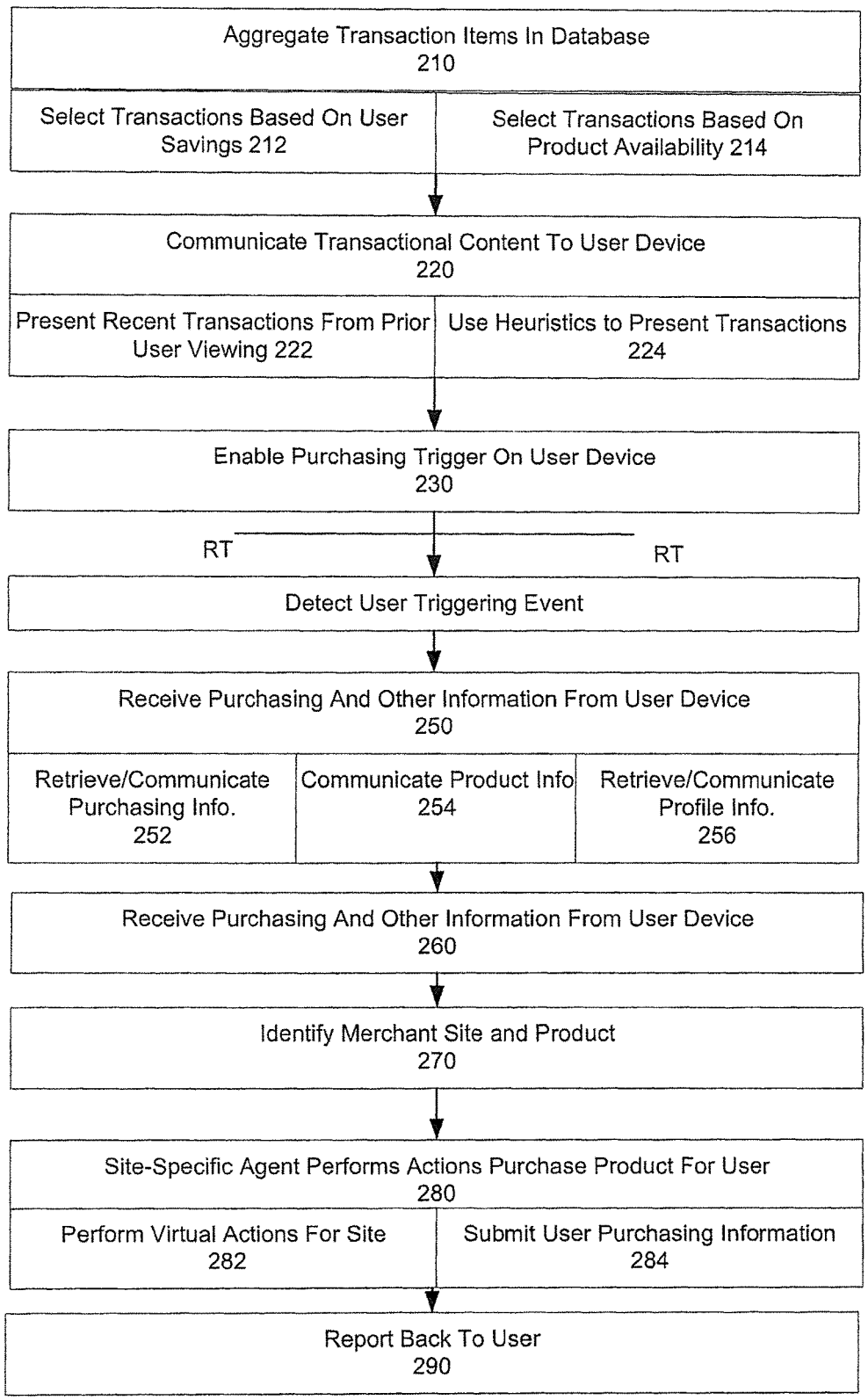
FIGS. 2-5 show example machine-implemented methods in accordance with some embodiments described herein.

FIG. 2 describes a method for aggregating merchandise transaction content for use in enabling online transactions for merchandise, according to one or more embodiments. The system 100 may be implemented to aggregate merchandise transaction data items from multiple different merchant websites and sources (210). In some embodiments, the aggregated transaction items may be filtered, based on selection criteria that includes (i) savings offered to the customer (212), (ii) product availability (214), and/or (iii) user profile information. Product availability may factor in consideration such as the availability of different sizes or colors for a given merchandise item. As an addition or alternative, historical pricing data can be checked (e.g., from prior crawls) to determine whether an offering "a good deal" when only good deals are being included in the aggregated display. For example, while a merchandise item may be listed with a 50% discount, historical data may indicate that the merchandise item has been offered with a 60% discount after each week during which a 50% discount is offered. In such instances, the presence of historical data may weigh for or against selecting the offering for display on the device. In other embodiments, the deal can be included with an indicator providing relevant and/or all historical data to a user for the user to consider when making a purchasing decision. For example, if the merchandise item corresponds to an item of clothing, considerations as to whether the product will be selected for subsequent presentation include whether the product is available in popular sizes or color options and/or sizes and color options of interest to the user (as determined based on the corresponding user profile).

System 100 may communicate transaction content to individual client devices based on the aggregated transaction data items stored in the database (220). As mentioned with some embodiments, the transaction data items may be updated or refreshed periodically. For example, over the course of a day, crawler 112 of aggregation component 110 may access a common set of websites for products that are offered as discounts, or on a "deal" basis. With each iteration, the transaction data items stored in the database 116 may be updated or refreshed, so as to reflect relatively fresh transactions available to the user. In some embodiments, an adaptive and programmatic process may be developed in which sites that include selections which change more rapidly are checked and refreshed more rapidly. For example, the aggregation component 110 may develop a schedule for some or all websites in order to time the frequency in which the sites are checked for new offerings.

According to some embodiments, when transactional content is communicated to client devices, the client devices may optionally display merchandise transactional data items that are new from the time of the users prior viewing (222). As an alternative or addition, the merchandise transactional data items that are presented on the client device may be selected based on heuristics (224). For example, the transactional data items may be presented to the individual user based on factors such as (i) transactional items that link to merchant sites that are popular (e.g., transactional component 120 may register counts to identify popular merchants or product offerings), (ii) transactional items that identify products that are popular, and/or (iii) preferences that are known about the user regarding merchants (e.g., favorite user websites), brands, or product types or classifications (e.g., user prefers deals relating to electronic sources clothing).

In some embodiments, system 100 provides, or otherwise enables a purchasing trigger on client devices (230). As described in above in connection with FIG. 1A, for example, trigger component 154 may (i) generate a feature that is displayed in association with individual merchant transactional data items on the client device 150, and (ii) enable the user to perform a simplified action to enter input for purpose of initiating a series of operations on the client device and server side-subsystem for completing a transaction to purchase a selected merchandise item. In an embodiment, the trigger component 154 is integrated into a client functionality that can be downloaded onto the user device. In variations, the trigger component 154 is provided using session-based code (e.g. scripts executed through a browser).

At run-time, a user may enter input relating to the trigger component 154 to initiate a triggering event (240). The client device 150 may respond to the triggering event (250) by retrieving purchasing information (252) (e.g., credit card information and/or merchant account information) and/or other profile components stored in memory of the device, and communicating the purchasing information, along with product information (254) (e.g., an identifier that identifies the transaction item and/or the merchant and product) and/or other profile information (256) (e.g., user preference to size and color) to the transaction component 120 of the network subsystem 102.

While some embodiments described herein provide that the user's information is stored on the user device, other embodiments may provide for some of the information to be stored remote from the user's device, such as on the network (e.g., cloud). For example, some or all of the user's financial information (e.g., credit card information) and/or other profile components may be stored on a networked device located remote from the consumer's device. This information can be retrieved and used when the user makes a product selection.

The transactional component 120 can receive the purchasing and/or other information from client device 150 (260). In some embodiment, the information provided can be based on a prior determination of what information is needed as different websites and/or forms may require different profile components. The merchant identifier and product may be determined from the received information (270). A merchant or site-specific agent is retrieved based at least in part on the merchant identifier, and the agent is then used to perform actions for purchasing the identified merchandise item on behalf of the user (280). In some embodiments, the agent can be retrieved earlier in the process and assist in determining what profile components are needed for a particular transaction. As such, the user profile may be over-inclusive for at least some transactions, and where the user profile likes sufficient information, the user may be prompted to provide it during the process.

At 280, the agent can be configured to map one or more profile components to the particular fields of the merchant's form(s). The mapping actions performed can include performing virtual user-interactions (282), such as virtual clicks to add the selected merchandise item to a shopping cart and then checkout. Where applicable (as determined by analyzing the form to be completed), the mapping actions can also include specifying user purchasing information to the merchant site, such the user's payment method and account number, the shipping address, and product selection information. For each site, the actions performed can complete the transaction to purchase the item for the user.

The results of the transaction, including the total price paid (e.g., including shipping and tax) may be reported back to the client device (290). For example, the transaction can be reported back to the client device via an application-message that is rendered to the user by the client device.

Figure 3:
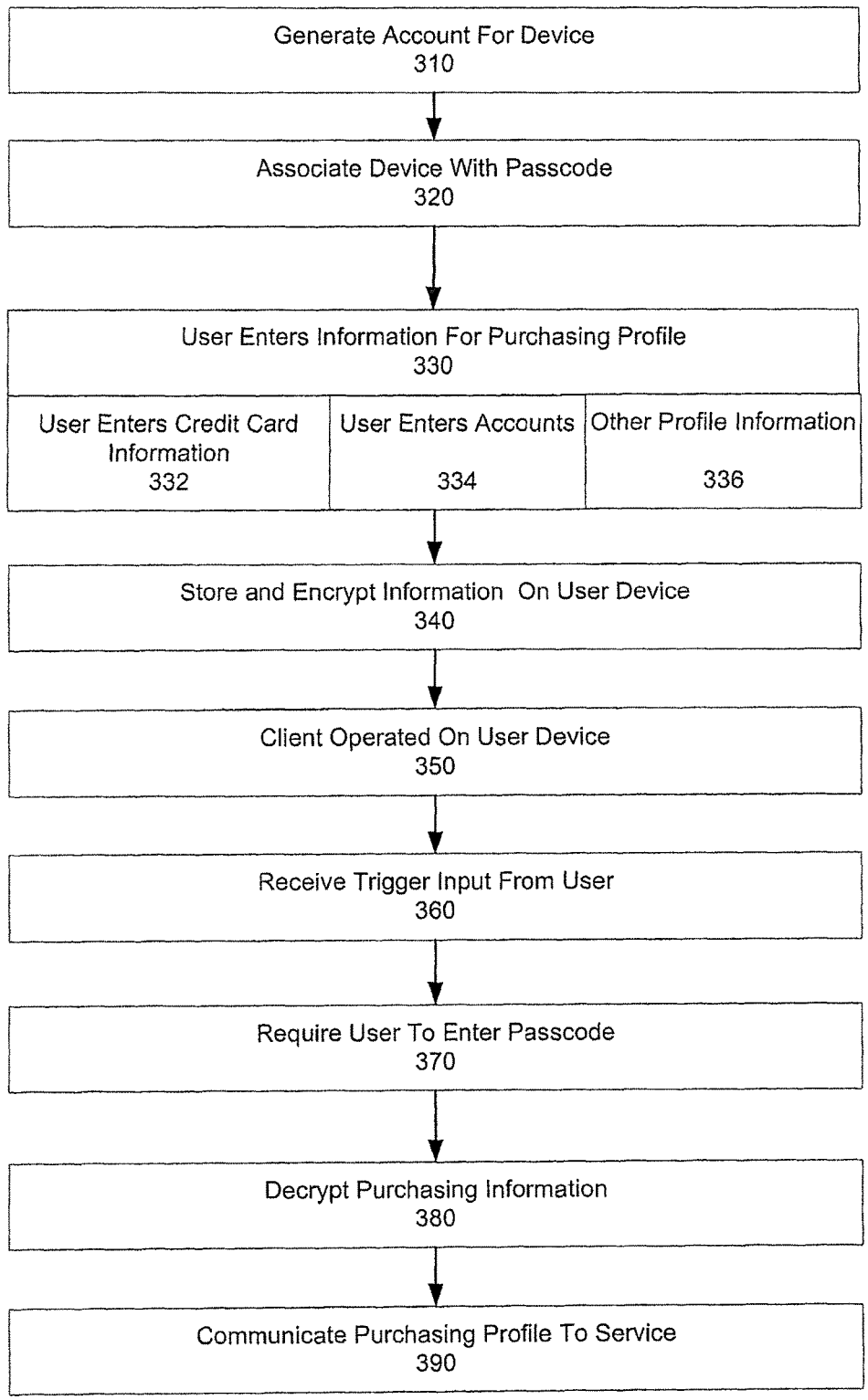

A method is discussed in connection with FIG. 3 that is directed to enabling a client device to be configured and operated for purpose of enabling subsequent network subsystem to act on behalf of the client in purchasing merchandise, according to some embodiments. Client device 150 can be configured to generate a device-specific account and/or user profile associated therewith (310), meaning the account/profile is associated uniquely with a particular device and/or user. The account/profile information may further require the user to specify a pass-code that can be used to authenticate the user. Should the user, for example, migrate to a new device, the client may not be operative to access the user's information unless the user manually re-entered the information on the new device. In some embodiments, the user profile includes a programmatically generated password that is hidden to the user and specific to the device. The information stored on the device, such as the purchasing information, may not be communicated to the network subsystem, but maintained private to the device in an encrypted form. Additionally, the account may be associated with a device passcode (320) that prohibits access to the client device, functionality provided thereby, and/or to purchasing or other information. In this way, the user can store purchasing information on the client device, and that information can be protected from device intrusions by the passcode, and further from network intrusions by way of the network subsystem being ignorant of the information stored on the device. Furthermore, when the user makes a purchase, the user is able to authenticate himself via the passcode, and the device authenticates to the network subsystem by way of the device specific login.

In some embodiments, the user device can be configured to receive information entered by the user for the user's profile (330). This information can include the user entering, for example, financial account information for purpose of supplying funds for making purchases (332). Additionally, merchant account information may be supplied (334). Other profile components, such as the user's shipping information, and preferences (e.g. size, color, shipping etc.) may also be supplied by the user.

Some or all of the information provided by the user may be encrypted (340). For example, the purchasing information may be encrypted. In variations, the passcode associated with the device may be used as a mechanism to unlock (or provide a private key) to the encrypted information.

At run time, the client device may be configured to initiate various functionality and operate (350). For example, the user may launch a client application on a mobile computing device. The client application have been downloaded from an online store or other type of market place. When running, the client application configured the client device to retrieve updated merchandise transaction content 157 from the transaction database 116, and display individual transaction items in association with a trigger input feature that enables the user to make purchasing selections using, for example, a simplified action such as an icon selection (which can be performed by, for example, tapping an icon on a touch-sensitive screen).

The triggering input may subsequently be received from the user (360) (e.g., user taps icon on screen). In some embodiments, the user is required to enter the passcode after making a purchase selection (370). In this way, unauthorized purchasing activity is precluded. The information stored for the users purchasing activity is then decrypted (380) (e.g., purchasing information, such as a user's financial account information). The purchasing information, along with the product and other information (e.g., user's preferences) are then communicated to the network subsystem 102 (390), which performs the subsequent operations required to purchase the identified merchandise item on behalf of the user.

Figure 4:
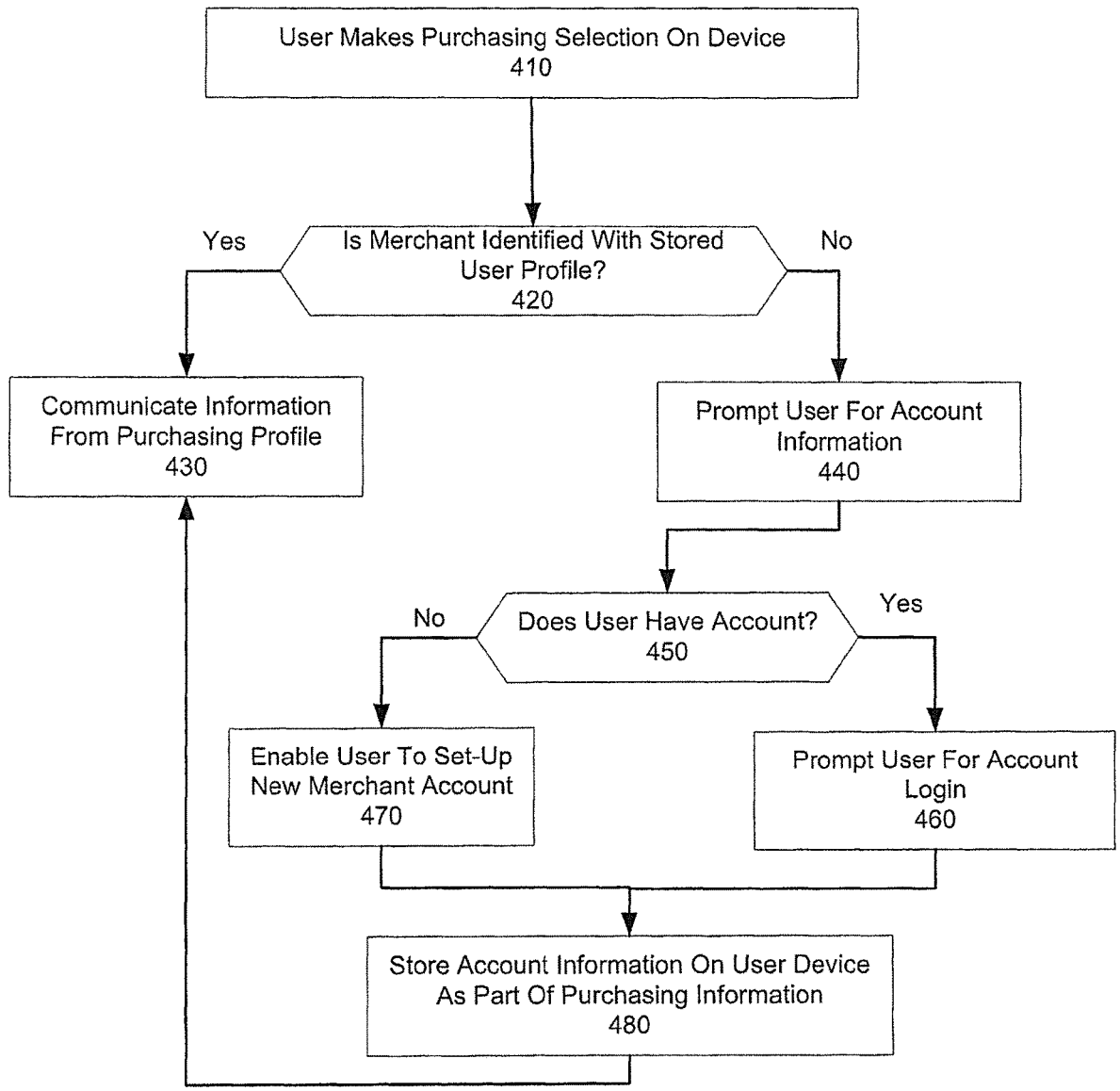

FIG. 4 describes a method for operating a client device that may enable server-side actions that complete a transaction to purchase a merchandise item on behalf of a user of the client device, according to some embodiments. For example, the user device can be configured to relay a purchasing selection made by the user using the client device (410). As described with other embodiments, the purchasing selection may corresponds to the user selecting, for example, a trigger input, such as provided by an icon.

In response to receiving the trigger input, a determination can made as to whether the merchant identified by the selected transactional item is known to the client device 150 (420). For example, in one embodiment, when the user operates the client device 150 to make purchases from a merchant, the merchant identifier is stored on the user device, along with other information specific to that merchant or merchant site, such as, for example, the user's login information to that merchant site. Over time, a list of merchants may be identified on the client based on user purchasing selections. With each selection, if the merchant is known (e.g., the user has previously used a client to select merchandise from that merchant), then information from the user's purchasing profile, including purchasing and other information is communicated to the network side subsystem 102 (430).

If the merchant's website is unknown, new or modified since the user last interacted therewith, the client device may generate an interface to prompt the user for account information to that specific merchant (440). For example, if the user selects a product from a website that the user has not previously selected from, then the determination is that the website is operated by or unknown merchant and the prompt is generated to have the user enter account information for that particular website. As another example, a detemiination may be first made as to whether or not profile components provided previously by the user (e.g., for other transactions) can be used for the current transaction. According to embodiments, the client device 150 uses internal information to make the determination of (420). Thus, for example, under an embodiment such as described, the client does not communicate with the network side subsystem 102 to retrieve, for example, user account information for the particular merchant that is deemed to be unknown on the client.

According to an embodiment, the interface may also prompt the user to specify whether the user does indeed have an account with the particular merchant specified by the selected transaction item. Accordingly, a determination can be made as to whether the user input indicates whether the user does have an account with the merchant of the selected transaction item (450). If the user has an account, the user can indicate as such in response to the prompt generated in (450) by entering the users account login and password for the particular merchant (460). If the user does not have an account with the particular merchant, the user may reply as such, and then be prompted to enter new user account login and password information (470). The account information determined from (460) or (470) may be incorporated into the user profile stored on the client device and/or elsewhere in system 100 (480). The information may then be communicated to the network side subsystem 102, as described in (430).

Figure 5:
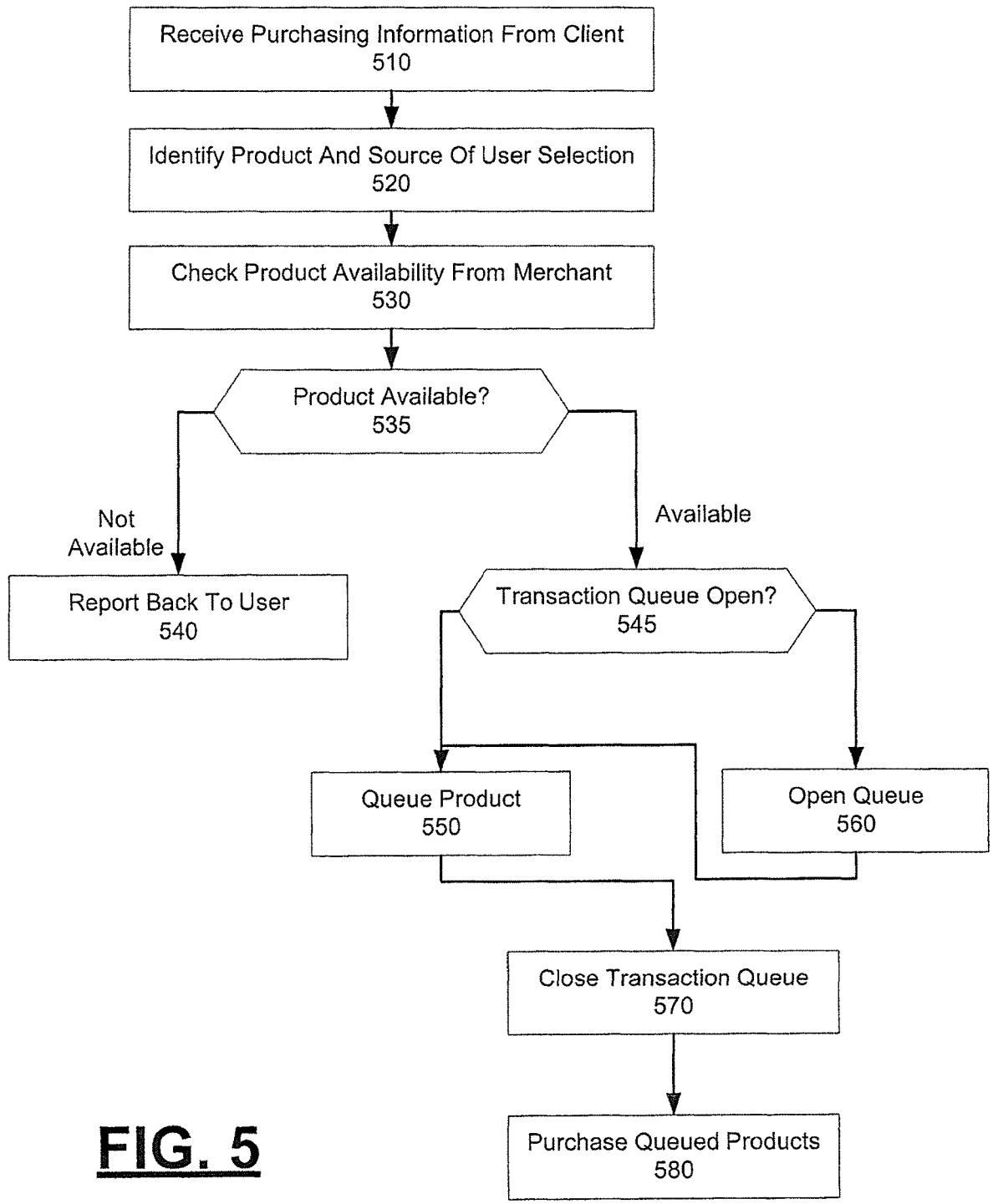

FIG. 5 describes a method for implementing a queue for individual user's request to purchase merchandise items and/or other products. Purchasing and product information can be received from the client device (510). From the information communicated from the client device, the product and source information (e.g., website address) of the user selection can be identified (520). When applicable, the transaction component 120 may check for product availability from the merchant and/or other source identified from the information communicated by client device 150 (530). A determination can be made as to whether the product is available (535). If the product is unavailable, this information may be communicated back to the user promptly, or responsively to the user's selection performed on the client device. If the product is available, a determination can be made as to whether a transaction queue is open for the particular client (545). In some embodiments, a transaction queue is open if the client had signaled previously, and within a designated duration of time (e.g., 30 min.), a purchase selection input for product that was deemed available. Variations may exist as to how the transaction queues maintain open. For example, in some variations, the transaction queue is open if the time following any prior purchasing requests is less than some designated amount, while in other implementations, the transaction queue can be open for a designated duration following a first in time purchasing request.

Thus for example, the determination may identify when a user is making a second or third purchase in succession during a specific window of time. If determination is that the transaction queue is open, then the current purchasing selection is queued (550).

If the determination is that no transaction queue is open, then the transaction queue is opened (560), and the purchasing selection is queued (550). In other words, the transaction component 120 locks the users request to purchase a merchandise item, and waited designated duration to see whether the user makes additional selections for merchandise, particularly from the same merchant or source.

After designated duration of time, the transaction queue may be closed (570). The transaction component may then perform the steps required to purchase from the merchant source(s) to merchandise items of the users purchasing request while the transaction queue was open (580).

IMPLEMENTATION EXAMPLES

FIGS. 6A-6M show example displays that may be presented by, for example, a client device in accordance with some embodiments herein. In the examples provided, the client device corresponds a mobile computing device 602, such as used for cellular or wireless telephony and messaging. In variations, different computing platforms may be used for embodiment such as described.

Figure 6A:
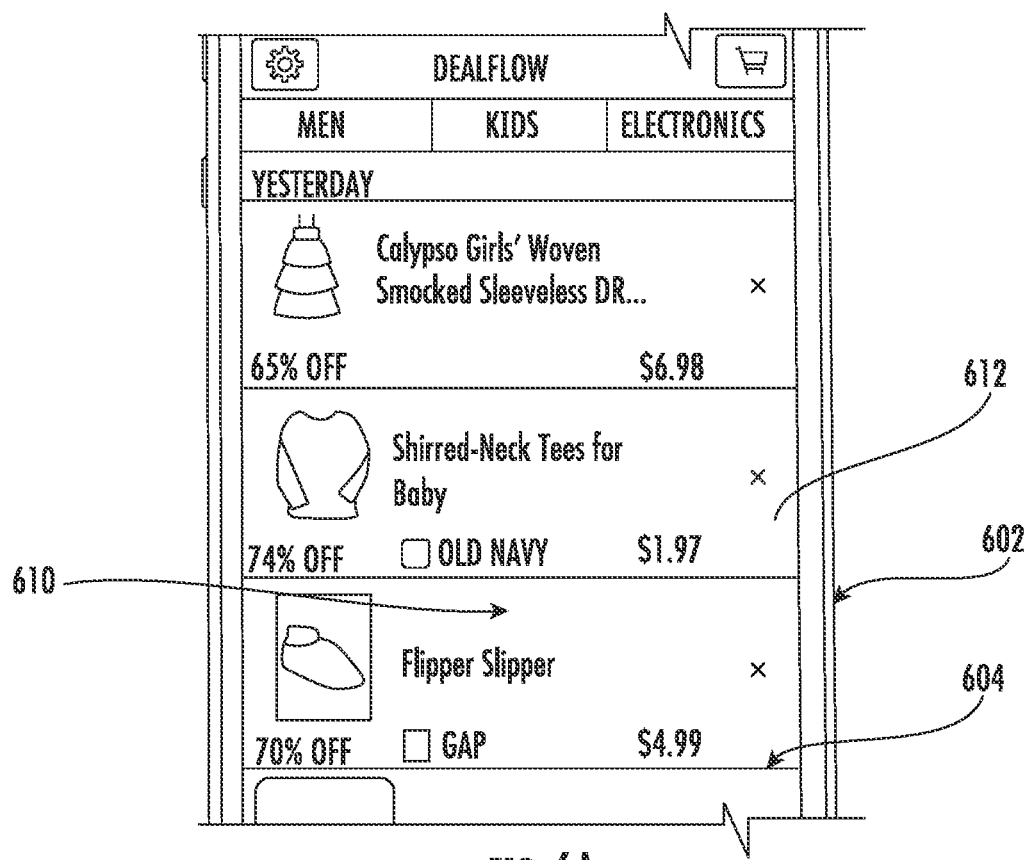

FIG. 6A illustrates a rendering of merchandise transaction content 610, which displays numerous merchandise transactional data items 612. Each transactional data item 612 may originate from a merchant source, such as an e-commerce website where a merchandise offering is provided. In this way the merchandise transaction cost and 610 represents an aggregation of online offerings, including, for example, daily deals or clearance sale items currently discounted from their normal prices.

Figure 6B:
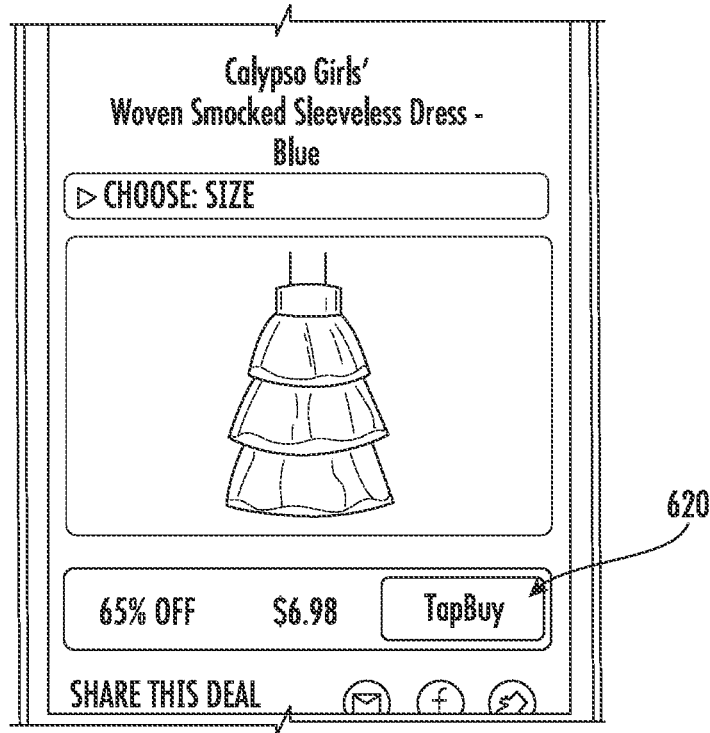

FIG. 6B illustrates an implementation in which a user selects a transactional data items 612, corresponding to a merchandise item that the user may wish to purchase. The transactional data automated detect an image of the merchandise, as well as textual information provided by the merchant source regarding the offering. Additionally, sale information, such as the savings associated with the item may be provided. As described elsewhere, the trigger 154 may generate a user interface feature 620 that enables the user to trigger a series of substantially automated operations that result in the user purchasing the item. In some embodiments, the user interface feature 620 is presented as an icon, that the user can activate by tapping the display screen 604 of the device 602 at a location where the icon is rendered.

Figure 6C:
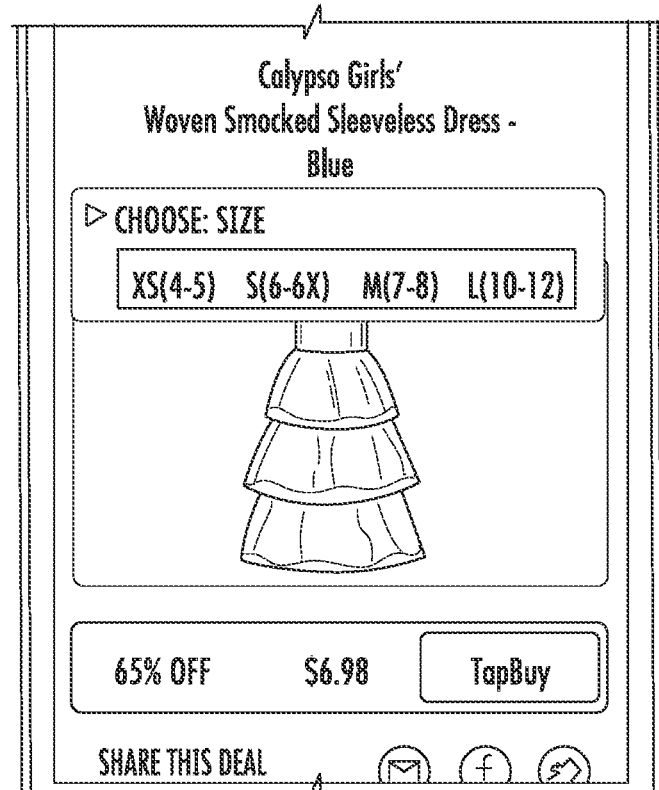

FIG. 6C illustrates the user is able to make selections from the merchandise offering provided in the selected transactional data item. In the example shown, in which the merchandise is an item of clothing, the selection of the user can correspond to size. In variations color or other variations may also be selected by the user. For other kinds of goods, such as computing devices, user selections can correspond to, for example, the performance level of the computing device, such as the size of the memory of the device, the speed of it the processor, or the type of operating system incorporated in the device.

Figure 6D:
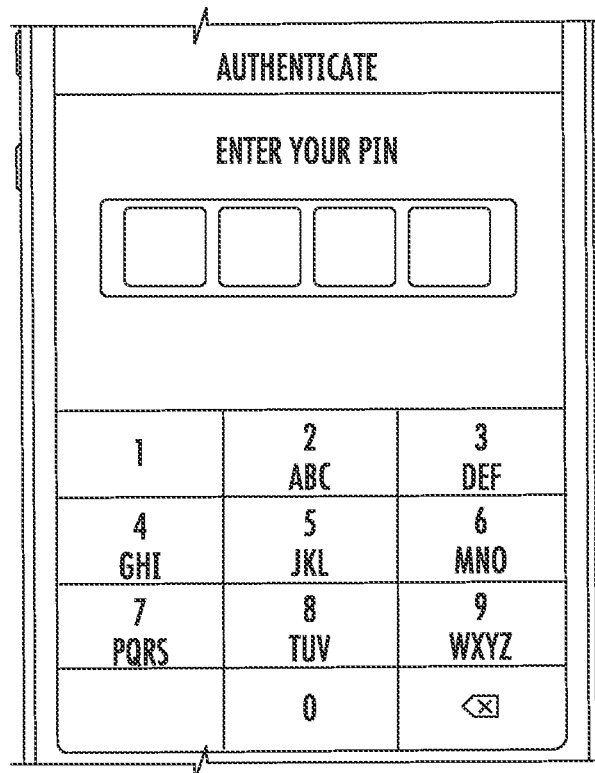

As mentioned, the user can select an intent to purchase the item by tapping the user interface feature 620. FIG. 6D illustrates an implementation which the user enters a four digit passcode after activating the user interface feature 620. The passcode enables the user to be authenticated as described above. In variations, the passcode may be required prior to the user being able to open the application.

Figures 6E, 6F, 6G:
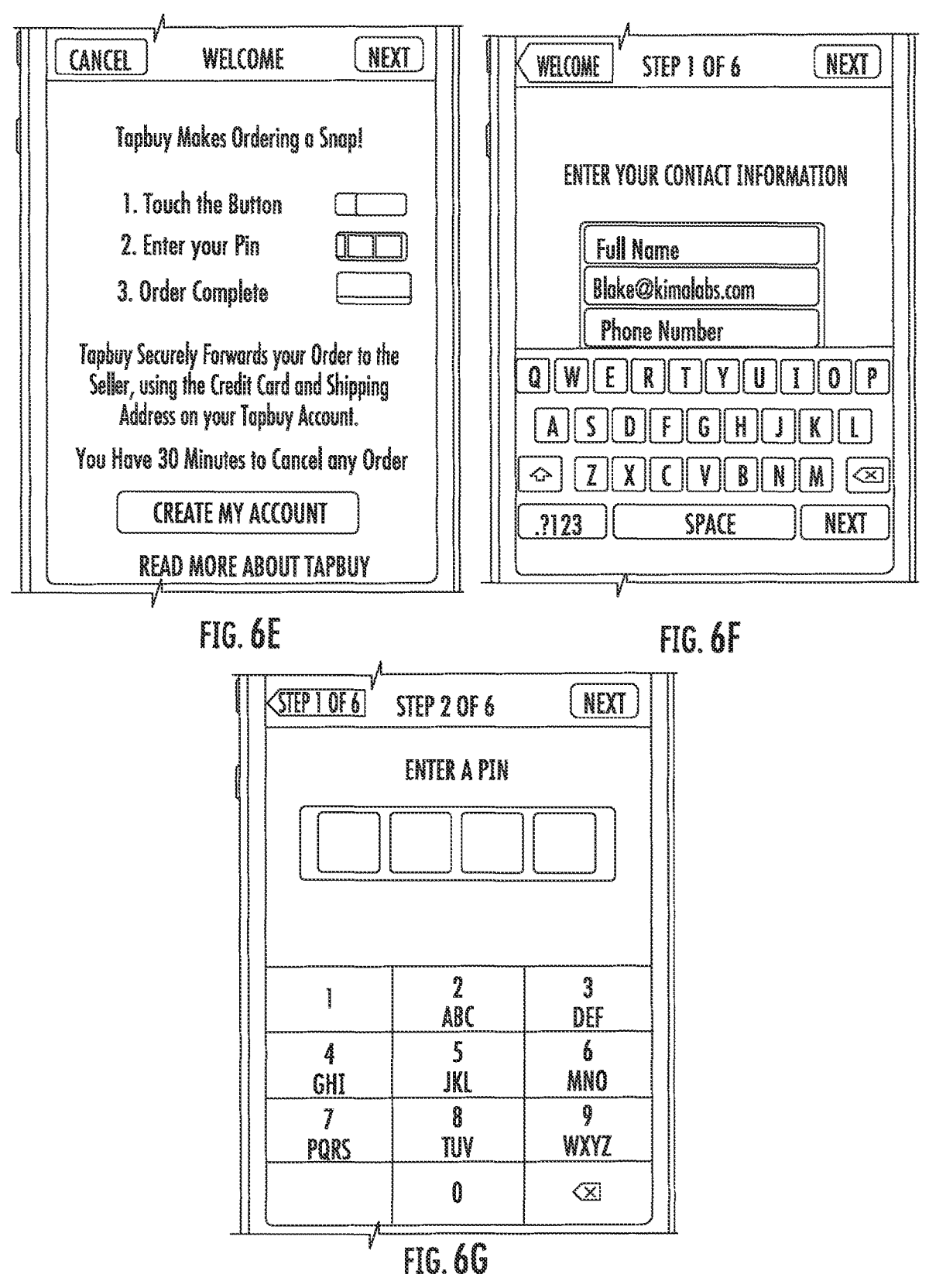

FIG. 6E-G illustrate an example set up process for user. According to embodiments, the setup process may be initiated by the user the first time the user operates the client on a given device. Thus, embodiments provide for a set up process that is device specific, in that the user is required to set up a purchasing profile (e.g., financial confirmation, name, shipping address, and/or other profile components) that resides on the user's device. If the user changes devices, the purchasing profile of the user may or may not migrate to the new device. Additionally, some embodiments provide that if a determination is made as to whether there is a security threat on the computing device 602 (e.g., user attempts to log in multiple times and fails), the user profile and/or account information may automatically be deleted, and the user may be required to set up the purchasing profile again. In this way, the user is protected against, for example, the client device being stolen.

Figure 6H:
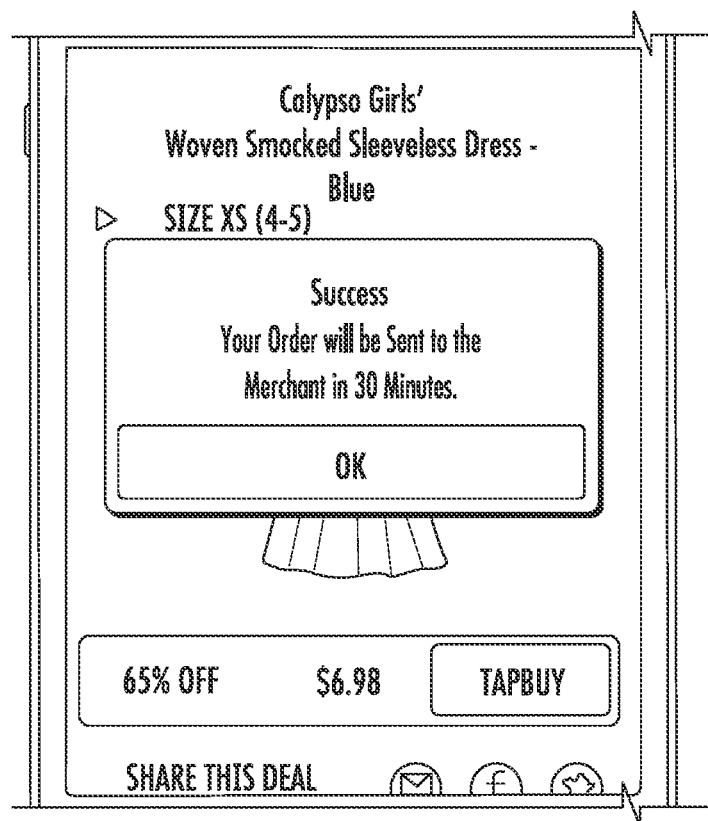

FIG. 6H illustrates an example of how feedback can be provided to the user in response to their activation of the feature 620. In some embodiments, the feedback displayed may be in response to a result such as the required purchasing and related information being communicated from the client device to the network-side subsystem. As mentioned with some embodiments, the actual purchasing actions may be performed on the network-side subsystem after some duration of time (e.g., 30 minutes) after the communication is communicated.

Figure 6I:
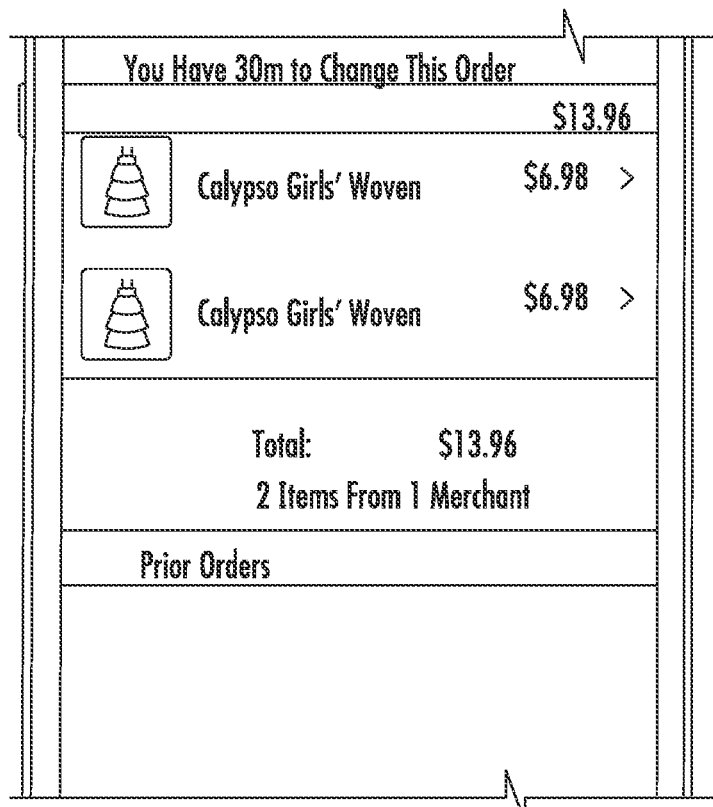

FIG. 6I illustrates an example summary page that can be presented to the user to indicate current and/or past purchases. In the example shown, all of the user's orders from a particular merchant during a current or recent session or displayed on one screen. In variations, order summaries may be depicted for multiple merchants and sessions at one time.

Figures 6J, 6K, 6L, 6M:
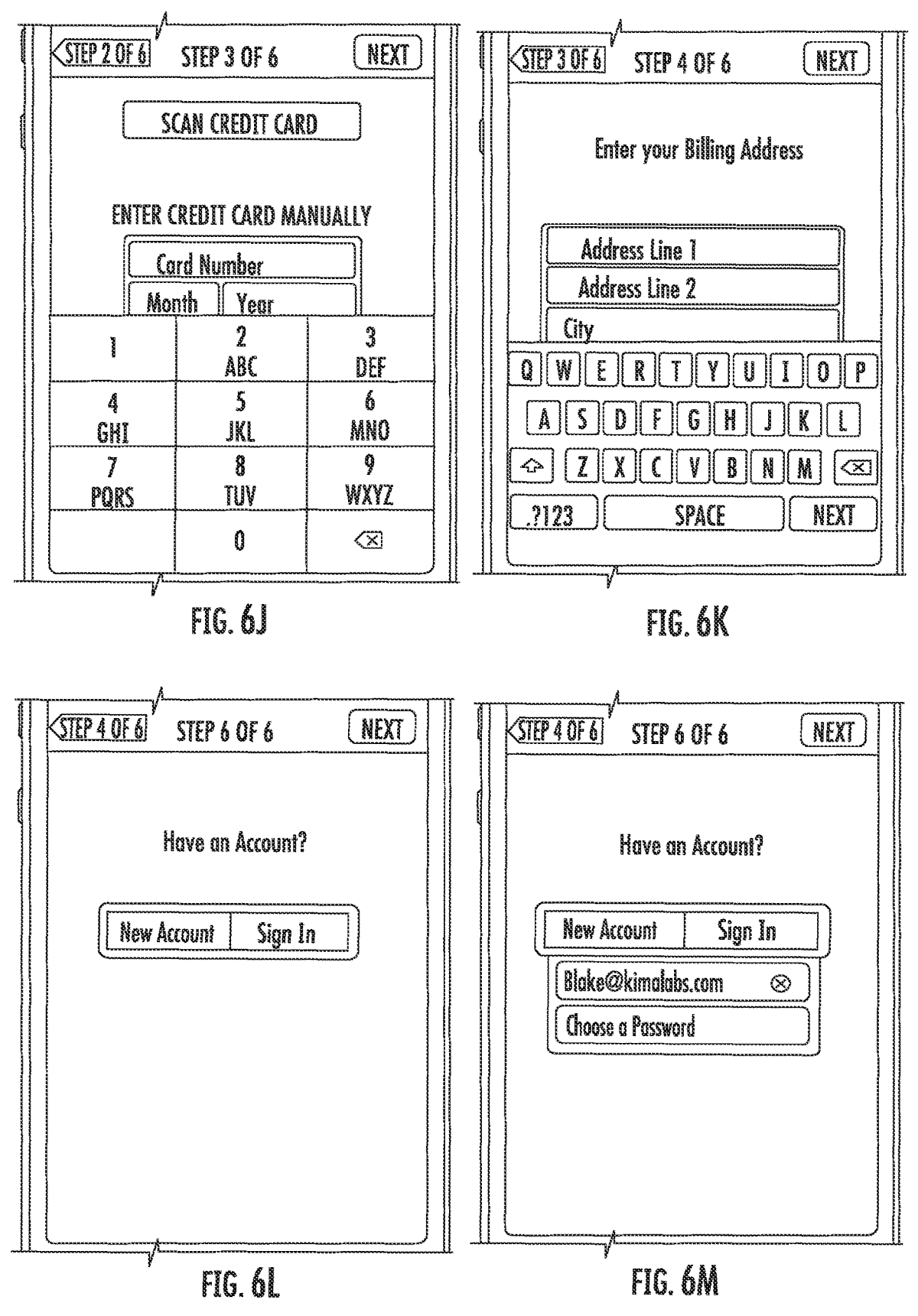

FIG. 6J and FIG. 6K show example interfaces that may be provided by the client device which enable the user to set up a new profile. The information provided from the user includes, for example, billing address, financial account information, and/or other profile components. The user may also be required to enter a passcode. The user may setup a new profile when, for example, using the client for the first time, after switching devices, or after a designated security event occurs.

FIG. 6L and FIG. 6M illustrate an interface that may be provided to the user in response to the client determining that the user has selected to purchase merchandise from a merchant that has no known history with the user (based on user activity performed on the device). When the client determines that the user has selected to purchase from a merchant that has no known history on that device with the user, the client may generate a panel (FIG. 6L) that asks the user whether they have an account with that particular merchant. If the user does not have an account with the merchant, the user may be given an opportunity to enter information on the client device for setting up a new profile with the merchant. Alternatively, if the user does have an account with the merchant, the user may specify his or her login information, which is stored on the client device and then put in use to complete the transaction the user initiated.

Many modifications and other embodiments of the inventions set forth herein will come to mind to one skilled in the art to which these embodiments of the invention pertain having the benefit of the teachings presented in the foregoing descriptions and the associated drawings. For example, although the examples discussed herein are generally related to facilitating online purchases between a consumer and merchant, similar functionality can be applied for any type of situation where user information is to be conveyed to a networked device. Although networks, such as those that comprise the Internet, are referred to herein, the network between the user device and merchant device can be a Bluetooth network and/or any other peer-to-peer based communication mechanism. For example, a user may use a cellular phone as a form of payment, as a mechanism to convey deal offer redemption data (such as a code used to identify a deal voucher number being redeemed by the consumer), to provide personal information needed to register to receive the merchant's newsletter, and/or for any other reason. Therefore, it is to be understood that the embodiments of the invention are not to be limited to the specific examples disclosed and that modifications and other embodiments are intended to be included within the scope of the appended claims. Although specific terms are employed herein, they are used in a generic and descriptive sense only and not for purposes of limitation.

What is claimed is:

1. An apparatus configured to facilitate online transactions on behalf of a user, the apparatus comprising at least one processor, a transaction component, and at least one memory, the at least one memory having computer-coded instructions therein, wherein the computer-coded instructions are configured to, when executed by the at least one processor, cause the apparatus to:
    receive, by the transaction component from a consumer device via a network, purchase information, the purchase information comprising one or more merchandise transaction data items, a merchant identifier associated with each of the one or more merchandise transaction data items, and user profile information, the user profile information comprising profile components;
    receive, via the transaction component, a request to complete one or more electronic forms associated with the purchase information;
    retrieve, via a merchant interface of the transaction component, a first programmatic agent associated with a first merchant identifier from an agent library, the first programmatic agent configured to programmatically map one or more profile components to one or more data entry fields in a first electronic form; and
    programmatically map, via the first programmatic agent, the one or more profile components to one or more particular data entry fields in the first electronic form to execute a purchase transaction associated with the one or more merchandise transaction data items associated with the first merchant identifier, such that an online transaction is facilitated with a first merchant associated with the first merchant identifier on behalf of the user, wherein programmatically mapping the one or more profile components to the one or more particular data entry fields in the first electronic form comprises:
        configuring, via the first programmatic agent, the at least one processor to programmatically map the one or more profile components to the one or more particular data entry fields in the first electronic form;
        identifying, via the at least one processor configured by the first programmatic agent, the one or more profile components required by the first electronic form;
        retrieving, via the at least one processor configured by the first programmatic agent, the identified one or more profile components from the user profile information; and
        communicating, via the merchant interface of the transaction component, the identified one or more profile components to a remotely-located network server of the first merchant associated with the first merchant identifier in a manner that causes the first electronic form to be completed programmatically.

2. The apparatus of claim 1, wherein each of the one or more merchandise transaction data items represents a merchandise product and the first merchant identifier represents an online retailer.

3. The apparatus of claim 1, wherein the computer-coded instructions are further configured to cause the apparatus to:
    receive authentication information from the consumer device; and
    determine if the consumer device is authenticated based on the authentication information.

4. The apparatus of claim 1, wherein the computer-coded instructions are further configured to cause the apparatus to:
    access a website associated with the first merchant identifier;
    generate the first programmatic agent associated with the first merchant identifier in accordance with a structure of the website; and
    cause storage of the first programmatic agent in the agent library in association with the first merchant identifier.

5. The apparatus of claim 4, wherein the structure of the website is a single webpage comprising one or more fillable fields that prompt a consumer for specific information.

6. The apparatus of claim 4, wherein the structure of the website comprises a plurality of displays, each display configured to be presented on a mobile device and wherein one or more displays prompts a consumer for specific information.

7. The apparatus of claim 4, wherein generating the first programmatic agent associated with the first merchant identifier in accordance with the structure of the website comprises analyzing one or more electronic forms associated with the website.

8. The apparatus of claim 7, wherein analyzing the one or more electronic forms associated with the website comprises determining a presence of one or more content markers on the website.

9. The apparatus of claim 8, wherein determining the presence of one or more content markers on the website comprises detecting a presence of a shipping content marker by analyzing text content, other website content, or a combination thereof.

10. The apparatus of claim 7, wherein analyzing the one or more electronic forms associated with the website comprises analyzing underlying code of the website.

11. The apparatus of claim 7, wherein analyzing the one or more electronic forms associated with the website comprises analyzing a document object model (DOM) of the website.

12. The apparatus of claim 1, wherein the computer-coded instructions are further configured to cause the apparatus to:
   determine whether the first electronic form has been modified from a previous retrieval of the first electronic form and programmatic mapping of the one or more profile components to the one or more particular data entry fields in the first electronic form;
   in response to determining that the first electronic form has been modified, update the first programmatic agent in accordance with the modified first electronic form; and
   cause storage of the updated first programmatic agent in the agent library in association with the first merchant identifier.

13. The apparatus of claim 1, wherein programmatically mapping the one or more profile components to the one or more particular data entry fields in the first electronic form comprises:
   transmitting, to the remotely-located network server of the first merchant associated with the first merchant identifier, a virtual click corresponding to an addition of at least one of the one or more merchandise transaction data items to a virtual shopping cart associated with the first merchant.

14. The apparatus of claim 1, wherein programmatically mapping the one or more profile components to the one or more particular data entry fields in the first electronic form comprises:
   transmitting, to the remotely-located network server of the first merchant associated with the first merchant identifier, a virtual click corresponding to a selection of one or more characteristics of at least one of the one or more merchandise transaction data items.

15. The apparatus of claim 1, wherein programmatically mapping the one or more profile components to the one or more particular data entry fields in the first electronic form comprises:
   transmitting, to the remotely-located network server of the first merchant associated with the first merchant identifier, payment information in accordance with a structure of the first electronic form.

16. The apparatus of claim 1, wherein the computer-coded instructions are further configured to cause the apparatus to:
   retrieve a second programmatic agent associated with a second merchant identifier from the agent library, the second programmatic agent configured to programmatically map one or more profile components to one or more data entry fields in a second electronic form associated with the second merchant identifier; and
   programmatically map the one or more profile components to the one or more particular data entry fields in the second electronic form to execute a purchase transaction associated with the one or more merchandise transaction data items associated with the second merchant identifier, such that the online transaction is facilitated on behalf of the user.

17. The apparatus of claim 1, wherein the user profile information comprises one or more of a consumer address, a consumer name, a consumer payment information, a username, and a password.

18. The apparatus of claim 1, wherein the user profile information comprises one or more encrypted profile components.

19. The apparatus of claim 1, wherein identifying the one or more profile components required by the first electronic form comprises:
   determining whether merchant account login information is associated with the user profile information, wherein the merchant account login information is specific to the first merchant associated with the first electronic form; and
   in response to determining that the merchant account login information is associated with the user profile information, identifying the merchant account login information as at least one of the one or more profile components required by the first electronic form.

* * * * *